(12) United States Patent
Hollingsworth

(10) Patent No.: US 11,441,988 B2
(45) Date of Patent: Sep. 13, 2022

(54) FLOWMETER PHASE FRACTION AND CONCENTRATION MEASUREMENT ADJUSTMENT METHOD AND APPARATUS

(71) Applicant: MICRO MOTION, INC., Boulder, CO (US)

(72) Inventor: Justin Craig Hollingsworth, Fort Collins, CO (US)

(73) Assignee: MICRO MOTION, INC., Boulder, CO (US)

(*) Notice: Subject to any disclaimer, the term of this patent is extended or adjusted under 35 U.S.C. 154(b) by 180 days.

(21) Appl. No.: 16/980,654

(22) PCT Filed: Apr. 9, 2018

(86) PCT No.: PCT/US2018/026719
§ 371 (c)(1),
(2) Date: Sep. 14, 2020

(87) PCT Pub. No.: WO2019/199268
PCT Pub. Date: Oct. 17, 2019

(65) Prior Publication Data
US 2021/0018416 A1  Jan. 21, 2021

(51) Int. Cl.
*G01N 9/36* (2006.01)
*G01F 25/10* (2022.01)
(Continued)

(52) U.S. Cl.
CPC .............. *G01N 9/36* (2013.01); *G01F 23/14* (2013.01); *G01F 25/10* (2022.01); *G01N 2009/006* (2013.01)

(58) Field of Classification Search
CPC .............. G01N 9/36; G01N 2009/006; G01N 2291/0224; G01N 2291/0226;
(Continued)

(56) References Cited

U.S. PATENT DOCUMENTS

2010/0170322 A1* 7/2010 Van Cleve ............ G01F 15/024
703/2

FOREIGN PATENT DOCUMENTS

| WO | 2000019175 A1 | 4/2000 | |
|---|---|---|---|
| WO | WO-2012027409 A2 * | 3/2012 | .............. G01F 1/74 |
| WO | WO-2016140734 A1 * | 9/2016 | ........... G01F 1/8413 |

* cited by examiner

*Primary Examiner* — Herbert K Roberts
*Assistant Examiner* — Anthony W Megna Fuentes
(74) *Attorney, Agent, or Firm* — The Ollila Law Group LLC

(57) ABSTRACT

A vibratory meter (5) is provided, having a driver (104) and a vibratory member (103, 103') vibratable by the driver (104). At least one pickoff sensor (105, 105') is configured to detect vibrations of the vibratory member (103, 103'). Meter electronics (20) comprise an interface (301) configured to receive a vibrational response from the at least one pickoff sensor (105, 10540 ), and a processing system (303) coupled to the interface (301). The processing system (303) is configured to measure a drive gain (306) of the driver (104), and measure a total density (325) of a multiphase process fluid in the vibratory meter (5), and determine whether the drive gain (306) is below a first threshold. A liquid/liquid phase concentration allocation is determined with the measured total density (325) if the drive gain (306) is below the first threshold, and a flow rate for each liquid phase is calculated.

10 Claims, 4 Drawing Sheets

(51) Int. Cl.
*G01N 9/00* (2006.01)
*G01F 1/84* (2006.01)
*G01F 23/14* (2006.01)

(58) Field of Classification Search
CPC ........ G01N 2291/0228; G01N 33/2823; G01F 23/14; G01F 25/10; G01F 1/8436; G01F 1/74; G01F 1/8468
See application file for complete search history.

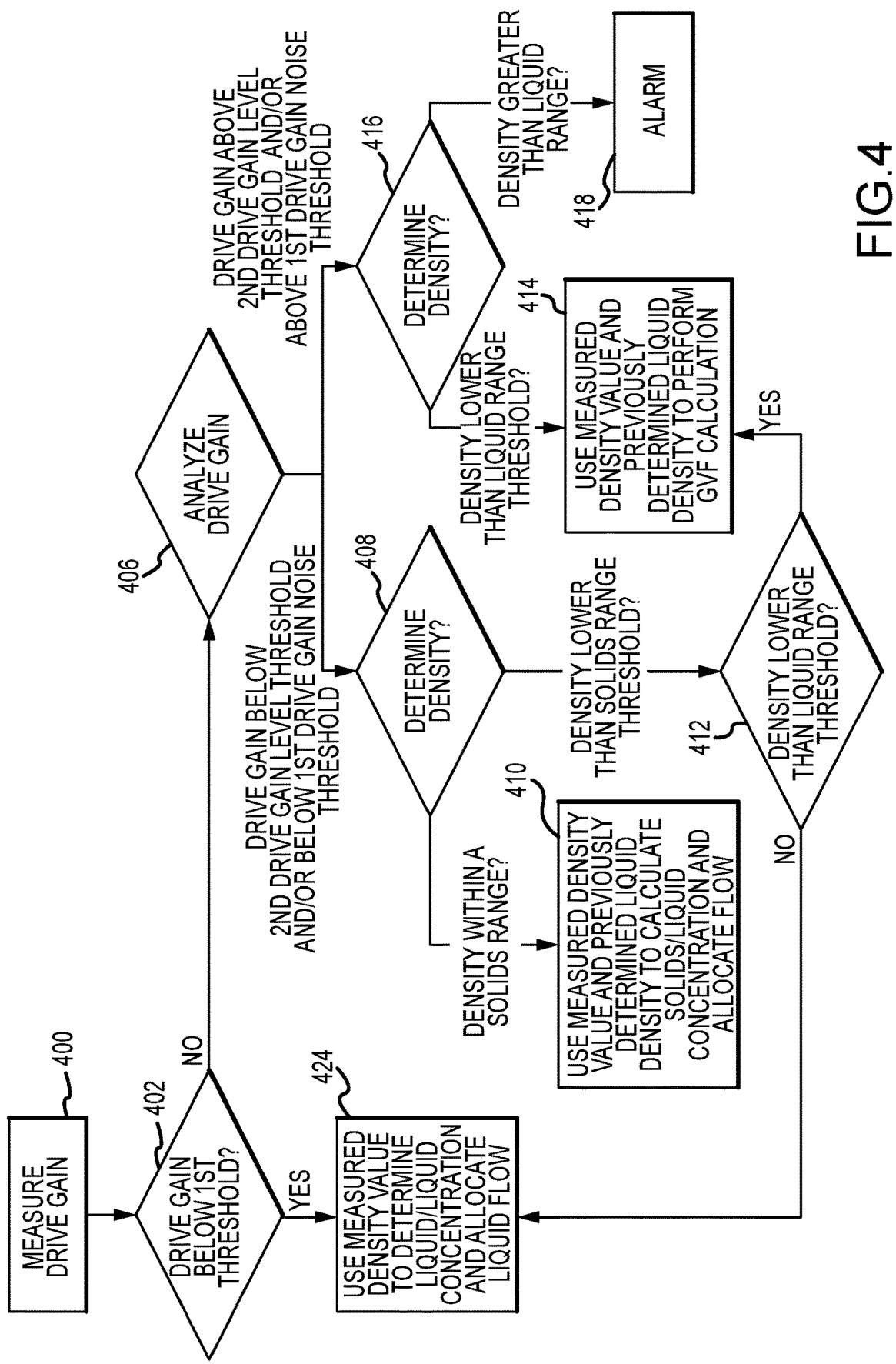

FLOWMETER PHASE FRACTION AND CONCENTRATION MEASUREMENT ADJUSTMENT METHOD AND APPARATUS

TECHNICAL FIELD

The present invention relates to vibratory meters, and more particularly, to a method and apparatus for adjusting measurements based upon phase fraction composition.

BACKGROUND OF THE INVENTION

Vibrating densitometers and Coriolis flowmeters are generally known, and are used to measure mass flow, density, and other information related to fluid flowing through a conduit in the flowmeter or a conduit containing the densitometer. The fluid may comprise a liquid, a gas, a liquid with suspended particulates and/or entrained gas, or combinations thereof. Exemplary flowmeters are disclosed in U.S. Pat. Nos. 4,109,524, 4,491,025, and Re. 31,450, all to J. E. Smith et al. These flowmeters typically have one or more conduits of a straight or curved configuration. Each conduit configuration in a Coriolis mass flowmeter, for example, has a set of natural vibration modes that may be of simple bending, torsional, or coupled type. Each conduit can be driven to oscillate at a preferred mode. Some types of mass flowmeters, especially Coriolis flowmeters, are capable of being operated in a manner that performs a direct measurement of density to provide volumetric information through the quotient of mass over density. See, e.g., U.S. Pat. No. 4,872,351 to Ruesch for a net oil computer that uses a Coriolis flowmeter to measure the density of an unknown multiphase fluid. U.S. Pat. No. 5,687,100 to Buttler et al. teaches a Coriolis effect densitometer that corrects the density readings for mass flow rate effects in a mass flowmeter operating as a vibrating tube densitometer.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

Meter electronics connected via a vibratory meter driver generate a drive signal to operate the driver and also to determine a density and/or other properties of a process material from signals received from the pickoffs. The driver may comprise one of many well-known arrangements such as a piezo driver or a magnet having an opposing drive coil. An alternating current is passed to the driver for vibrating the conduit(s) at a desired amplitude and frequency. It is also known in the art to provide the pickoffs in an arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

Coriolis meters offer high accuracy for single phase flows. However, when a Coriolis flowmeter is used to measure multiphase fluids, such as fluids including entrained gas, the accuracy of the meter can be significantly degraded. This is similarly true for flows having entrained solids and for mixed-phase fluid flows, such as when hydrocarbon fluids contain water.

Entrained gas is commonly present as bubbles in the flow material. The size of the bubbles can vary depending on the amount of air present, the pressure of the flow material, and the temperature. A related and significant source of error arises from fluid decoupling. Fluid decoupling results from the motion of the gas bubbles with respect to the liquid as a result of the vibration of the tube. The relative motion of the gas bubbles with respect to the liquid is driven by a buoyant force that is similar to the force that causes bubbles to rise to the surface under the influence of gravity. However, in a vibrating tube, it is the acceleration of the vibrating tube that causes the bubbles to move more than the acceleration of gravity. Because the dense fluid has more mass than the light bubbles, the bubbles have greater acceleration than the fluid in the direction of the tube acceleration. Due to the greater acceleration of the bubbles, on each oscillation of the flow conduit, the bubbles move further than the flow conduit. Additionally, the bubble motion causes some of the fluid to move less than the flow conduit. This is the basis of the decoupling problem. As a result, the fluid that has the lower vibrational amplitude undergoes less Coriolis acceleration and imparts less Coriolis force on the flow conduit than it would in the absence of bubbles. This results in the flow rate and density characteristics being under-reported (negative flow and density errors) when entrained gas is present. Compensating for fluid decoupling has been difficult because there are several factors that determine how much the bubbles move with respect to the fluid. Fluid viscosity is an obvious factor. In a very viscous fluid, bubbles (or particles) are effectively frozen in place in the fluid and little flow error results. Another influence on bubble mobility is the bubble size. The drag on a bubble is proportional to the surface area, whereas the buoyant force is proportional to the volume. Therefore, very small bubbles have a high drag to buoyancy ratio and tend to move with the surrounding fluid. Small bubbles subsequently cause small errors. Conversely, large bubbles tend not to move with the surrounding fluid and result in large errors. The same holds true for particles. Small particles tend to move with the fluid and cause small errors.

The density difference between the fluid and the gas is another factor that may contribute to flowmeter inaccuracy. The buoyant force is proportional to the difference in density between the fluid and the gas. A high pressure gas can have a high enough density to affect the buoyant force and reduce the decoupling effect.

In addition to measurement errors, the effect of multiphase flow on Coriolis meters is increased by damping on the flow conduit, resulting in the diminishment of flow conduit vibratory amplitude. Typically, meter electronics compensate for this diminished amplitude by increasing the drive energy, or drive gain, in order to restore the amplitude. Even very small amounts of gas can cause a large increase in drive gain.

Previously, drive gain has been used to determine whether or not there is multi-phase flow in the meter. If a meter's drive gain goes above a certain threshold, then the fluid in the meter is considered to be multi-phase flow and corrective action can be taken to improve the accuracy of the measured values. In prior art meters, a default value for drive gain threshold is used. In practice, the default value must be set conservatively high so that it will work for most applications. This must be done for three reasons: 1) Every Coriolis meter has a different base drive gain. This is the drive gain required to drive the flow conduit under purely single phase flows. Because of this, the drive gain must be high enough to work for every meter. For example, a typical nominal drive gain for one meter family might be 2%, whereas the nominal value for another meter family might be 20%. This nominal value depends on many things, including magnet strength and design, coil design, and meter size/stiffness; 2) Purely liquid multi-component mixtures composed of one or more different density liquids will have the same decoupling effect as gas and liquid fluids, although much smaller. Errors are mostly negligible in purely liquid multi-component flow, but there can still be small increases in drive gain that should not be treated as gas. Again, the threshold must be high enough to not mistake purely liquid flow as gas and liquid flows; and 3) For some applications, there may never be periods of pure liquid from which to base hold values. However, often times there are periods of mostly liquid where only small traces of gas may exist. The drive gain threshold is set high enough so that these periods are treated as pure liquid so that hold values may be created, and the periods of very high gas may still be corrected. The default value works for some applications. However, for applications where there may be only small amounts of gas entering the meter, the default threshold may be too high. Due to drive gain's sporadic nature, and the potential that the drive gain threshold is set too high, this method does not always produce hold values from periods of minimal or no gas. For applications where there is always enough gas such that the drive gain never drops below the threshold, the default threshold is too low.

In some applications where fluid measurement is critical, yet there is little or no ability to control process fluids or conditions, the ability to make critical flow rate measurements and fluid quality measurements is extremely challenging. For example, in restaurant grease trap recycling applications, food solids, water, and oil are all found in the process material. Vacuum trucks used to pick up the grease often additionally entrains air therein. Tank levels are usually simply estimated by truck operators. The accuracy and reliability of this procedure is low, and there is monetary pressure to underestimate levels.

A method and apparatus is provided, wherein a flowmeter's processing is adjusted based upon the phase fraction composition, thus improving flowmeter accuracy.

SUMMARY OF THE INVENTION

A vibratory meter is provided, according to an embodiment, that comprises a driver, a vibratory member vibratable by the driver, and at least one pickoff sensor configured to detect vibrations of the vibratory member. Meter electronics is provided that comprises an interface configured to receive a vibrational response from the at least one pickoff sensor, and a processing system coupled to the interface. The meter electronics is configured to measure a drive gain of the driver, measure a total density of a multiphase process fluid in the vibratory meter, determine whether the drive gain is below a first threshold, and determine a liquid/liquid phase concentration allocation with the measured total density if the drive gain is below the first threshold, and calculate a flow rate for each liquid phase.

A method of flowmeter phase fraction and concentration measurement adjustment is provided according to an embodiment. The method comprises the steps of providing a vibratory flowmeter and flowing a multiphase process fluid through the vibratory flowmeter. A drive gain of a driver of the vibratory meter is measured. A density of the process fluid is measured. It is determined whether the drive gain is below a first threshold. A liquid/liquid phase concentration allocation of the process fluid is determined with the measured total density if the drive gain is below the first threshold, and a flow rate for each liquid phase is calculated.

Aspects

According to an aspect, a vibratory meter comprises a driver, a vibratory member vibratable by the driver, and at least one pickoff sensor configured to detect vibrations of the vibratory member. Meter electronics is provided that comprises an interface configured to receive a vibrational response from the at least one pickoff sensor, and a processing system coupled to the interface. The meter electronics is configured to measure a drive gain of the driver, measure a total density of a multiphase process fluid in the vibratory meter, determine whether the drive gain is below a first threshold, and determine a liquid/liquid phase concentration allocation with the measured total density if the drive gain is below the first threshold, and calculate a flow rate for each liquid phase.

Preferably, the processing system is configured to determine at least one of whether the drive gain is below a second threshold that is greater than the first threshold, and whether the drive gain is below a first drive gain noise threshold if the drive gain is above the first threshold.

Preferably, the processing system is configured to determine a solid/liquid phase concentration allocation with the measured total density and a previously determined liquid density, if the measured total density is within a solids density range, and calculate a flow rate for each phase.

Preferably, the processing system is configured to determine a liquid/liquid phase concentration allocation with the measured total density, if the measured total density is lower than a solids density range and within a liquids density range, and calculate a flow rate for each phase.

Preferably, the processing system is configured to determine a gas/liquid phase concentration allocation with the measured total density and a previously determined liquid density, if the measured total density is lower than a solids density range and within a gas density range, and calculate a flow rate for each phase.

Preferably, the processing system is configured to determine at least one of whether the drive gain is above a second threshold that is greater than the first threshold and whether the drive gain is above a first drive gain noise threshold, and determine a gas/liquid phase concentration allocation with the measured total density and a previously determined liquid density, if the measured total density is lower than a liquid density range, and calculate a flow rate for each phase.

According to an aspect, a method of flowmeter phase fraction and concentration measurement adjustment comprises the steps of providing a vibratory flowmeter and flowing a multiphase process fluid through the vibratory flowmeter. A drive gain of a driver of the vibratory meter is measured. A density of the process fluid is measured. It is determined whether the drive gain is below a first threshold. A liquid/liquid phase concentration allocation of the process fluid is determined with the measured total density if the drive gain is below the first threshold, and a flow rate for each liquid phase is calculated.

Preferably, the method comprises the step of determining at least one of whether the drive gain is below a second threshold that is greater than the first threshold, and whether the drive gain is below a first drive gain noise threshold if the drive gain is above the first threshold.

Preferably, the method comprises the step of determining a solid/liquid phase concentration allocation with the measured total density and a previously determined liquid density, if the measured total density is within a solids density range, and calculate a flow rate for each phase.

Preferably, the method comprises the step of determining a liquid/liquid phase concentration allocation with the measured total density, if the measured total density is lower than a solids density range and within a liquids density range, and calculate a flow rate for each phase.

Preferably, the method comprises the step of determining a gas/liquid phase concentration allocation with the measured total density and a previously determined liquid density, if the measured total density is lower than a solids density range and within a gas density range, and calculate a flow rate for each phase.

Preferably, the method comprises the steps of determining at least one of whether the drive gain is above a second threshold that is greater than the first threshold and whether the drive gain is above a first drive gain noise threshold, and determining a gas/liquid phase concentration allocation with the measured total density and a previously determined liquid density, if the measured total density is lower than a liquid density range, and calculate a flow rate for each phase.

BRIEF DESCRIPTION OF THE DRAWINGS

FIG. 4 is a flow chart illustrating an embodiment.

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
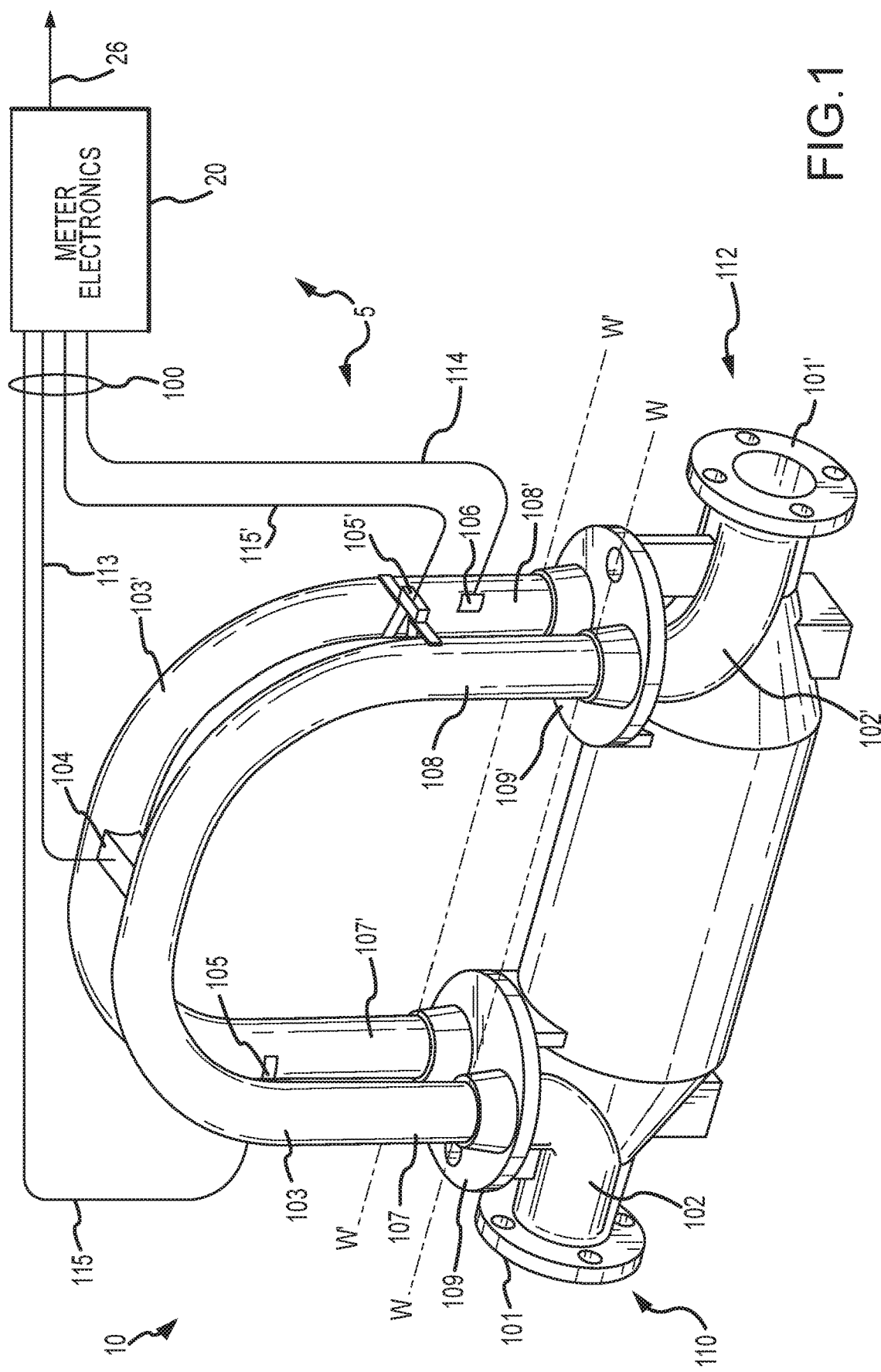
FIG. 1 illustrates a vibratory flowmeter according to an embodiment.

FIG. 1 illustrates a flowmeter 5, which can be any vibrating meter, such as a Coriolis flowmeter/densitometer, for example without limitation. The flowmeter 5 comprises a sensor assembly 10 and meter electronics 20. The sensor assembly 10 responds to mass flow rate and density of a process material. Meter electronics 20 are connected to the sensor assembly 10 via leads 100 to provide density, mass flow rate, and temperature information over path 26, as well as other information. The sensor assembly 10 includes flanges 101 and 101', a pair of manifolds 102 and 102', a pair of parallel conduits 103 (first conduit) and 103' (second conduit), a driver 104, a temperature sensor 106 such as a resistive temperature detector (RTD), and a pair of pickoffs 105 and 105', such as magnet/coil pickoffs, strain gages, optical sensors, or any other pickoff known in the art. The conduits 103 and 103' have inlet legs 107 and 107' and outlet legs 108 and 108', respectively. Conduits 103 and 103' bend in at least one symmetrical location along their length and are essentially parallel throughout their length. Each conduit 103, 103', oscillates about axes W and W', respectively.

The legs 107, 107', 108, 108' of conduits 103, 103' are fixedly attached to conduit mounting blocks 109 and 109' and these blocks, in turn, are fixedly attached to manifolds 102 and 102'. This provides a continuous closed material path through the sensor assembly 10.

When flanges 101 and 101' are connected to a process line (not shown) that carries the process material that is being measured, material enters a first end 110 of the flowmeter 5 through a first orifice (not visible in the view of FIG. 1) in flange 101, and is conducted through the manifold 102 to conduit mounting block 109. Within the manifold 102, the material is divided and routed through conduits 103 and 103'. Upon exiting conduits 103 and 103', the process material is recombined in a single stream within manifold 102' and is thereafter routed to exit a second end 112 connected by flange 101' to the process line (not shown).

Conduits 103 and 103' are selected and appropriately mounted to the conduit mounting blocks 109 and 109' so as to have substantially the same mass distribution, moments of inertia, and Young's modulus about bending axes W-W and W'-W', respectively. Inasmuch as the Young's modulus of the conduits 103, 103' changes with temperature, and this change affects the calculation of flow and density, a temperature sensor 106 is mounted to at least one conduit 103, 103' to continuously measure the temperature of the conduit. The temperature of the conduit, and hence the voltage appearing across the temperature sensor 106 for a given current passing therethrough, is governed primarily by the temperature of the material passing through the conduit. The temperature-dependent voltage appearing across the temperature sensor 106 is used in a well-known method by meter electronics 20 to compensate for the change in elastic modulus of conduits 103, 103' due to any changes in conduit 103, 103' temperature. The temperature sensor 106 is connected to meter electronics 20.

Both conduits 103, 103' are driven by driver 104 in opposite directions about their respective bending axes W and W' at what is termed the first out-of-phase bending mode of the flowmeter. This driver 104 may comprise any one of many well-known arrangements, such as a magnet mounted to conduit 103' and an opposing coil mounted to conduit 103, through which an alternating current is passed for vibrating both conduits. A suitable drive signal is applied by meter electronics 20, via lead 113, to the driver 104. It should be appreciated that while the discussion is directed towards two conduits 103, 103', in other embodiments, only a single conduit may be provided or more than two conduits may be provided. It is also within the scope of the present invention to produce multiple drive signals for multiple drivers, and for the driver(s) to drive the conduits in modes other than the first out-of-phase bending mode.

The meter electronics 20 may be coupled to a path 26 or other communication link. The meter electronics 20 may communicate density measurements over the path 26. The meter electronics 20 may also transmit any manner of other signals, measurements, or data over the path 26. In addition, the meter electronics 20 may receive instructions, programming, other data, or commands via the path 26.

Meter electronics 20 receive the temperature signal on lead 114, and the left and right velocity signals appearing on leads 115 and 115', respectively. Meter electronics 20 produce the drive signal appearing on lead 113 to driver 104 and vibrate conduits 103, 103'. Meter electronics 20 process the left and right velocity signals and the temperature signal to compute the mass flow rate and the density of the material passing through the sensor assembly 10. This information, along with other information, is applied by meter electronics 20 over path 26 to utilization means. An explanation of the circuitry of the meter electronics 20 is not needed to understand the present invention and is omitted for brevity of this description.

It should be appreciated that the description of FIG. 1 is provided merely as an example of the operation of one possible vibrating meter and is not intended to limit the teaching of the present invention. For example, a Coriolis flowmeter structure is described, but it will be apparent to those skilled in the art that the present invention could be practiced on a vibrating tube or fork densitometer without the additional measurement capability provided by a Coriolis mass flowmeter.

It is well understood that when there are two fluid phases with different densities present in a vibratory meter, there is decoupling that occurs between these two phases, and that the decoupling is a function of the difference in density of the carrier phase (liquid in this case) and the particle phase (solid) and the particle size, along with carrier phase viscosity and tube vibration frequency. This damping is a highly sensitive detection method of the presence of two phases. This damping presents itself in vibrating meters in both drive gain and pickoff amplitude. In the case of gas in a liquid process, for example without limitation, the drive gain quickly rises from about 2-5% to approximately 100%.

The combined effect of damping on energy input and resulting amplitude is known as extended drive gain, which represents an estimate of how much power would be required to maintain target vibration amplitude, if more than 100% power were available:

$$\text{Extended Drive Gain} = \text{Drive Gain} * \frac{\text{Drive Target}}{\left(\frac{\text{Max(Left Pickoff, Right Pickoff)}}{\text{Frequency}}\right)} \quad (1)$$

It should be noted that, for purposes of the embodiments provided herein, that the term drive gain may, in some embodiments, refer to drive current, pickoff voltage, or any signal measured or derived that indicates the amount of power needed to drive the meter at a particular amplitude. In related embodiments, the term drive gain may be expanded to encompass any metric utilized to detect multi-phase flow, such as noise levels, standard deviation of signals, damping-related measurements, and any other means known in the art to detect mixed-phase flow. In an embodiment, these metrics may be compared across the pick-off sensors in order to detect a mixed-phase.

The vibrating conduits or members take very little energy to keep vibrating at their first resonant frequency, so long as all of the fluid in the meter is homogenous with regard to density. In the case of the fluid consisting of two (or more) immiscible components of different densities, the vibration of the tube will cause displacement of different magnitudes of each of the components. This difference in displacement, or decoupling, and the magnitude of this decoupling has been shown to be dependent on the ratio of the densities of the components as well as the inverse Stokes number:

$$\text{Density Ratio} \equiv \frac{\rho_{fluid}}{\rho_{particle}} \quad (2)$$

$$\text{Inverse Stokes number} = \sqrt{\frac{2v_f}{\omega r^2}} \quad (3)$$

Where $\omega$ is the frequency of vibration, $v$ is the kinematic viscosity of the fluid, and $r$ is the radius of the particle. It should be noted that the particle may have a lower density than the fluid, as in the case of a bubble.

Decoupling that occurs between the components causes damping to occur in the vibration of the tube, requiring more energy to maintain vibration, or reducing the amplitude of vibration, for a fixed amount energy input.

Figure 2:
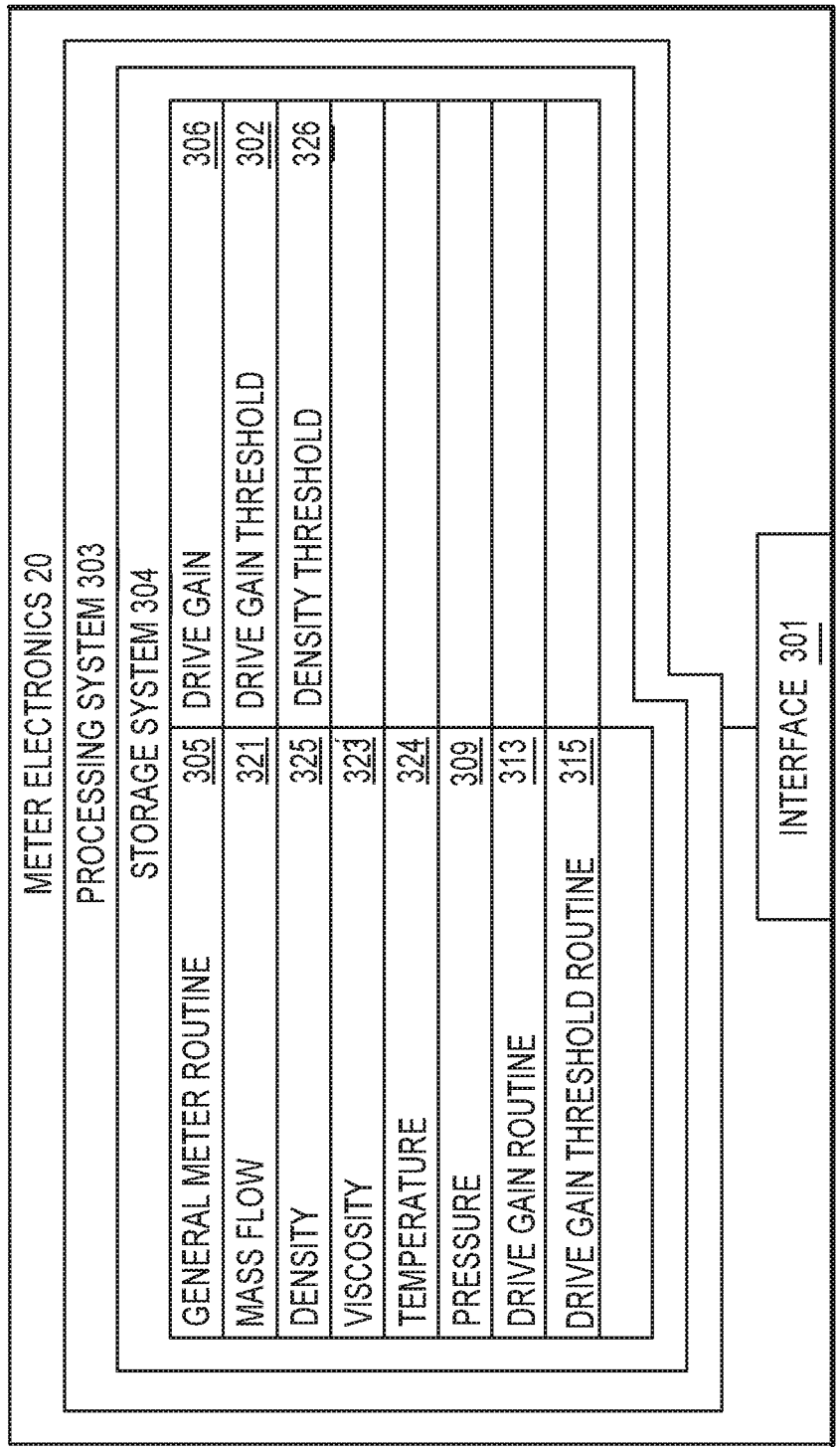
FIG. 2 illustrates meter electronics according to an embodiment.

FIG. 2 is a block diagram of the meter electronics 20 according to an embodiment. In operation, the flowmeter 5 provides various measurement values that may be outputted including one or more of a measured or averaged value of density, mass flow rate, volume flow rate, individual flow component mass and volume flow rates, and total flow rate, including, for example, both volume and mass flow of individual flow components.

The flowmeter 5 generates a vibrational response. The vibrational response is received and processed by the meter electronics 20 to generate one or more fluid measurement values. The values can be monitored, recorded, saved, totaled, and/or output.

The meter electronics 20 includes an interface 301, a processing system 303 in communication with the interface 301, and a storage system 304 in communication with the processing system 303. Although these components are shown as distinct blocks, it should be understood that the meter electronics 20 can be comprised of various combinations of integrated and/or discrete components.

The interface 301 may be configured to couple to the leads 100 and exchange signals with the driver 104, pickoff sensors 105, 105', and temperature sensors 106, for example. The interface 301 may be further configured to communicate over the communication path 26, such as to external devices.

The processing system 303 can comprise any manner of processing system. The processing system 303 is configured to retrieve and execute stored routines in order to operate the flowmeter 5. The storage system 304 can store routines including a general meter routine 305 and a drive gain routine 313. The storage system 304 can store measurements, received values, working values, and other information. In some embodiments, the storage system stores a mass flow (m) 321, a density (ρ) 325, a density threshold 326, a viscosity (μ) 323, a temperature (T) 324, a pressure 309, a drive gain 306, a drive gain threshold 302, and any other variables known in the art. The routines 305, 313 may comprise any signal noted as well as other variables known in the art. Other measurement/processing routines are contemplated and are within the scope of the description and claims.

The general meter routine 305 can produce and store fluid quantifications and flow measurements. These values can comprise substantially instantaneous measurement values or can comprise totalized or accumulated values. For example, the general meter routine 305 can generate mass flow measurements and store them in the mass flow 321 storage of the storage system 304, for example. Similarly, the general meter routine 305 can generate density measurements and store them in the density 325 storage of the storage system 304, for example. The mass flow 321 and density 325 values are determined from the vibrational response, as previously discussed and as known in the art. The mass flow and other measurements can comprise a substantially instantaneous value, can comprise a sample, can comprise an averaged value over a time interval, or can comprise an accumulated value over a time interval. The time interval may be chosen to correspond to a block of time during which certain fluid conditions are detected, for example, a liquid-only fluid state, or alternatively, a fluid state including liquids, entrained gas, and/or solids, solutes, and combinations thereof. In addition, other mass and volume flow and related quantifications are contemplated and are within the scope of the description and claims.

A drive gain threshold 302 may be used to distinguish mixed-phase flow and monitor solute dissolution. Different drive gain thresholds 302 may be utilized to differentiate between material flows comprising different phase fractions. Similarly, a density threshold 326 applied to the density 325 reading may also be used, separately or together with the drive gain, to distinguish mixed-phase flow and solute dissolution. Different density thresholds 326 may be utilized to differentiate between material flows comprising different phase fractions. Drive gain 306 may be utilized as a metric for the sensitivity of the flowmeter's 5 vibratory response to the presence of fluids of various phase fractions, for example without limitation. Drive gain thresholds 302 and density thresholds 326 may simply be entered or programmed into meter electronics 20, and may be chosen based upon process conditions, as will be understood by those skilled in the art.

In an embodiment, different drive gain thresholds 302 vary depending on the application, and may be discerned accordingly. In an embodiment, fluid properties and rates are assumed to remain relatively constant over time ("steady applications"), and it is assumed that there will be no sudden fluctuations. A working example of this, without limitation, is a naturally producing oil well in which the flow rate is driven by the well pressure underground. The pressure is assumed to remain fairly constant over short time periods (<1 day, for example). Artificial lift wells such as those driven by an electrical submersible pump would also fall into this application as the flow rates are kept fairly constant. As a result of fairly constant conditions, it is appropriate to be sensitive to small increases in drive gain and to remain in a corrective state the majority of the time. That is, for applications that are known to have constant flow rates and densities, it is often desirable to interpolate for lengthy periods of time in search of accurate measurements taken at periods of low-gas-content, thus ignoring much of the erroneous measurements taken at higher-gas-content periods in between. Again, oil/gas wells are merely example applications, and should not be considered limiting, as any flowmeter 5 application known in the art is considered herein.

In an embodiment, it is assumed that the mixture volume flow rate (gas and liquid) is constant while gas is present. Therefore, liquid flow rate may be calculated based on the following equation, for example without limitation:

$$\dot{V}_{liquid\ 2} = \dot{V}_{mixture} * (1-\text{GVF}) \quad (4)$$

Where:
GVF is the gas volume fraction.

$$\text{GVF} = \frac{\rho_{mix} - \rho_{liquid}}{\rho_{gas} - \rho_{liquid}} * 100 \quad (5)$$

Where:
$\rho_{mix}$ is the mixture density;
$\rho_{liquid}$ is the liquid density; and
$\rho_{gas}$ is the gas density.

In flow conditions where no gas is present, the mixture volume flow rate is equal to the liquid volume flow rate. However, in one embodiment, the assumption is made that mixture volume flow rate doesn't change when gas is present.

At times when a drive gain is low and stable, gas is not present in the pipeline and all measurements may be assumed to be accurate within normal flowmeter specifications. Many fluid sources involve only intermittent entrained gas, and over the course of an hour, or day, or other predetermined period of time, it is likely a time interval exists where little or no gas is present. During this time, the drive gain is low and stable and flow rate, density, and any other measurement made by the meter may be trusted and output to the user or recorded for statistical analysis. This would allow an accurate determination of component flow rates at that period of low drive gain, for example without limitation.

As noted above, when a flowmeter's 5 drive gain rises above a certain threshold, then the fluid in the meter is considered to be multi-phase flow, and corrective action is taken to improve the accuracy of the measured values. Thus, when drive gain is above the threshold, the meter operates in a corrective state. Hold values (measured variables utilized from a period of single phase flow) for density, volume flow rate, and mass flow rate from periods of low drive gain 306 (drive gain 306 below the drive gain threshold 302) are therefore utilized during the corrective state so as to replace or improve the accuracy of measured variables. Because flow rates and density can change over time, hold values must be periodically updated; however for the majority of the time, the drive gain threshold routine 315 may remain in a corrective state and interpolate through even small amounts of entrained gas. It is acceptable to remain in this corrective state for relatively long periods of time, as the alternative is to accept large errors associated with entrained gas in a flowmeter 5. Thus, it is more beneficial to measure accurate values only occasionally than to frequently take measurements that exhibit large errors. If the threshold is set too high, then the measured values and hold values may be based on multi-phase measurements and the corrected liquid values will be in error.

If the drive gain threshold is set too low, then hold values may never be determined during a given time period. For example, in applications where there is gas present at all/most times, such that the drive gain never drops below the threshold, the default threshold is clearly set too low. In an embodiment, the drive gain threshold 302 is thus set such that hold values are periodically determined from periods of minimum drive gain. Should the minimum drive gain increase or decrease over time, then the drive gain threshold 302 is adjusted automatically. In an embodiment, the drive gain threshold 302 value is determined not based on a desire to identify periods of time with and without gas, like in the prior art, but rather the drive gain threshold 302 is chosen specifically to determine the number of hold values it will create over a given period. This number of hold values and the time period can be specified by the user in an embodiment; however, this may also be determined at the time of flowmeter 5 construction/testing. For example, for a given application, it might make sense to automatically determine a drive gain threshold 302 that will allow for five updates to the hold values during a given time period. Five updates is merely an example, and more or less updates over a predetermined time frame is contemplated.

This concept represents a departure from the historical idea of choosing a drive gain threshold 302 as the value above which the drive gain threshold routine 315 assumes gas has been detected. Flowmeters 5 have the ability to detect even small amounts of entrained gas in a liquid stream via a measurement of tube drive power, known as the diagnostic drive gain 306. Drive gain 306 is a measure of the amount of drive power required to keep the flow conduits of a Coriolis meter vibrating at constant amplitude. For single phase measurement of gas or liquid, the drive gain 306 is low and steady, as relatively little power is required to vibrate a structure at its natural frequency. However, when even small amounts of gas is present in a liquid, or small amounts of liquid are present in a gas, the drive power required for vibration increases dramatically. This makes drive gain 306 a very reliable detection diagnostic for entrained gas. Historically, the drive gain threshold 302 was simply used as a way to identify portions of time where gas is present. This was basically employed as a binary indication of the presence/absence of gas. In the embodiments presented however, gas may be present often or always, so taking the best measurements possible—those with the least gas and lowest drive gain—is practiced. Thus, the drive gain threshold 302 may be automatically determined based not simply on detection of gas, but rather on finding the periods of minimum gas in order to find the best hold values available for a given period of time. This balances the need for accuracy with the need for occasionally updating values to detect changes in process flow rate and fluid composition. In some embodiments, however, drive gain thresholds 302 may simply be entered or programmed into meter electronics 20.

In order to determine the drive gain threshold 302, a predetermined time period of the drive gain signal may be monitored. An updated drive gain threshold 302 is determined based upon the minimum threshold required such that drive gain 306 drops below the drive gain threshold 302 a specified number of times over the predetermined time period. In an embodiment, an additional option is to require drive gain 306 to drop below the drive gain threshold 302 for a predetermined length of time. This predetermined length of time is the time needed for drive gain 306 to be below the drive gain threshold 302 before the drive gain threshold routine 315 determines entry into a corrective state and acquires new hold values. This protects against instantaneous excursions of a noisy drive gain signal that do not truly represent a sustained drop in damping due to less gas in the flow tubes.

The number of hold values desired over a predetermined time period may be determined based upon the application and conditions. A drive gain threshold 302 that would produce the desired number of hold values over the predetermined time period is estimated, and then used during the subsequent time period for the determination of hold values. Thus, in an embodiment, a new threshold is determined for a particular time period based off of readings from the preceding time period. Because process conditions are fairly steady in these scenarios, it is assumed that the threshold determined from one time period will be relevant during the next time period when it is used, thus producing roughly the same number of hold values. However, in an alternate embodiment, the drive gain threshold routine 315 is based on a rolling window of data rather than on discrete time periods. In this case, the drive gain threshold 302 would be continuously updated and be more relevant to current conditions.

In other applications, it may be assumed only that the liquid density remains constant during periods of high drive gain (i.e. "unsteady applications"). Because of this, it can only be assumed that mass flow rate measurements accurately measure the liquid mass flow rate when there is gas present. This allows liquid volume flow rate to be determined from the following equation, for example without limitation:

$$\dot{V}_{liquid\ 2} = \frac{\dot{m}_{liquid\ 2}}{\rho_{liquid\ 1}} \qquad (6)$$

For unsteady applications, it is possible that the liquid density may also fluctuate, possibly due to changes in watercut, for example, without limitation. Because of this, the drive gain threshold 302 is set slightly higher than for steady applications. As such, the flowmeter 5 does not spend as much time in a corrective state, which is in contrast to the above-noted steady applications where process conditions are constant enough that it is ideal to be more conservative and remain in a corrective state more often.

It should be noted that simply increasing the number of desired hold values will not achieve the desired behavior of real-time measurement. Drive gain 306 may be low and steady for most of the time in some unsteady applications despite that density, volume flow, and mass flow rate may fluctuate. It should also be noted that while drive gain is low, there are still often tiny fluctuations. For example, without limitation, even when there is no entrained gas in the process fluid, the drive gain will not stay constant at say 4%, but will rather fluctuate erratically between 3.9 and 4.1%. These fluctuations can be due to flow noise or pipe vibrations. Again, this is merely an example for illustrative purposes. Should the threshold methodology described above for steady applications be utilized, the threshold could be set relatively low (e.g. 4%, with reference to the example above), yet still produce many hold values. For unsteady applications, when drive gain is this low it would not be advantageous to hold density, since density might change, and it is important to note and measure this change to maintain accurate readings. Again, this is not much of a concern for steady applications, as density does not change quickly.

In an embodiment for unsteady applications, in order to prevent density or other hold values from being undesirably held in cases such as those described above, a constant may be added to the automatically determined drive gain threshold 302. Turning to the above example yet again, if the threshold were automatically determined to be 4%, given five hold values during a particular time period, then this could be increased by 5% to 9%, for example without limitation. This allows a measured density to be output most of the time, with exceptions made for periods having enough entrained gas to increase the drive gain significantly—much more than 5% above a no-gas period, for example.

Phase Fraction Adjustment

For applications where phase fractions could change during a process, embodiments are provided. Methods for measuring mass flow rate may be altered as process fluid phase (e.g. solids, water, oil, and gas) changes.

Density may be utilized to determine the composition of a fluid with two components that each have different densities. A simple example is watercut:

$$\text{Watercut} = \frac{\rho_{mix} - \rho_{water}}{\rho_{oil} - \rho_{water}} \qquad (7)$$

Density can also be used to determine the phase fraction (gas or liquid) of a process fluid, utilizing Equation 5. Similarly, the concentration of solids in a liquid may be determined as follows:

$$\text{Solids Fraction} = \frac{\rho_{mix} - \rho_{liquid}}{\rho_{solids} - \rho_{liquid}} * 100 \qquad (8)$$

Where:

$\rho_{solids}$ is the solids density.

Generally, drive gain behaves quite differently in the case of two liquids, gas and liquid, or solid and liquid. In the case of two liquids, drive gain is generally low and stable. In the case of liquid with gas, it will be much higher or saturated at 100%, and with solids, it is usually slightly elevated, but the signal contains more noise. All densities noted herein may be temperature compensated. The degree of temperature compensation and/or temperature compensation method utilized may change depending on the determined flow type or process fluid phase.

Figure 3:
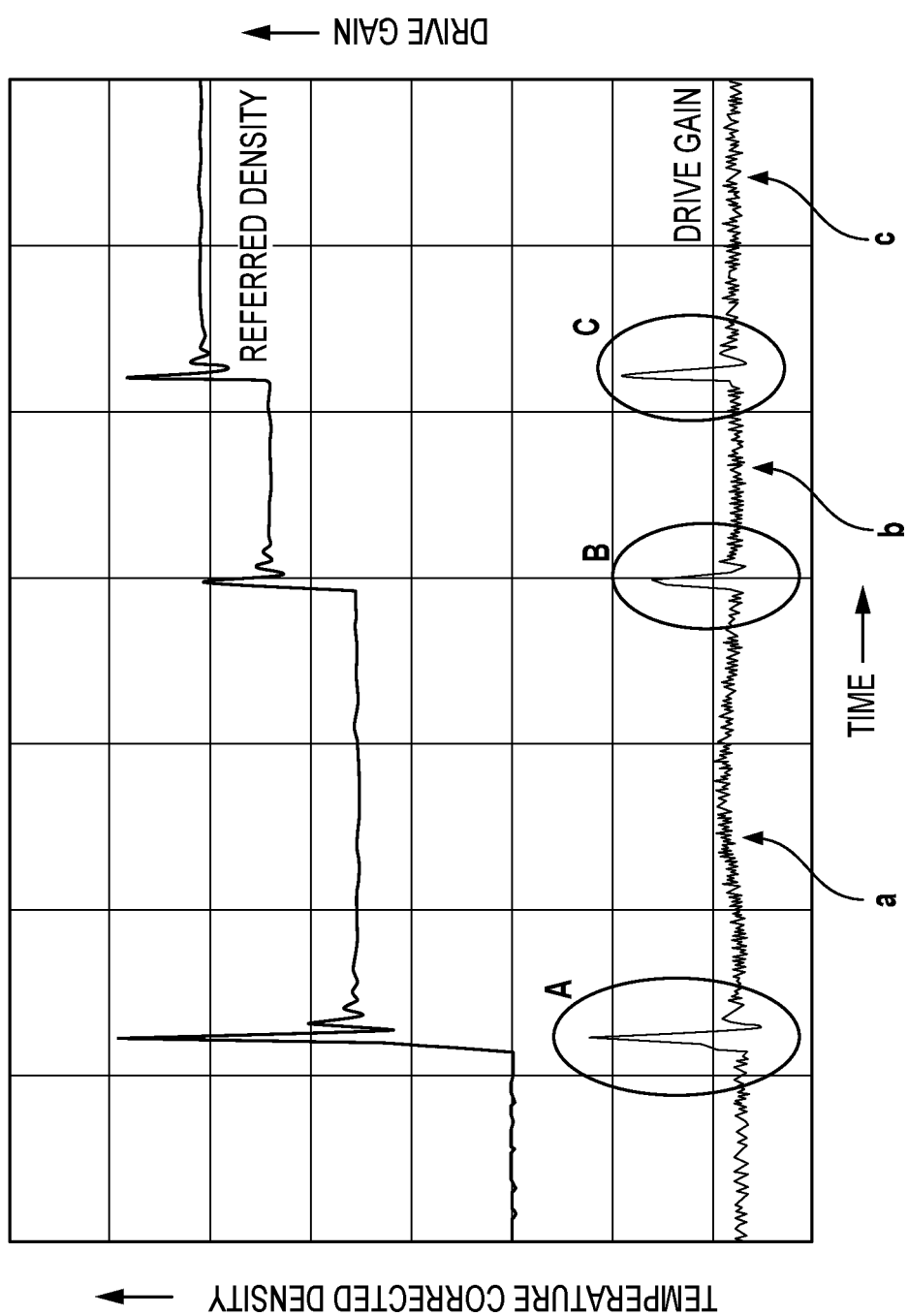
FIG. 3 is an example graph indicating solute addition to a monitored solution.

Turning to FIG. 3, a graph shows an example of how drive gain is utilized to detect the presence of solids in a solution. In the example graph provided, a solid solute is added at three points, A, B, and C. Drive gain sharply increases when the solute is added to solution, as indicated by peaks that correspond to solute additions A, B, and C. This is also accompanied by corresponding rises in density. The drive gain returns to a stable baseline, a, b, c, after peaking, and this indicates that the solute is solubilized. It should be noted that density trace stabilizes after each solute addition, but the solution density increases overall. In an embodiment, the detection of a stable post-solute-addition baseline indicates a solute has entered solution. The drive gain peaks, A, B, C, are clearly discernable. However, in an embodiment, when the addition of solute has a substantial effect on density, such as that illustrated, density change and/or density stability may be utilized as a primary indicator of dissolution, with the drive gain utilized as a confirmatory variable.

It should be noted that solid solutes having a different dissolution profile than that illustrated in FIG. 3 are also contemplated. In some instances, solute addition causes a slow increase in drive gain that levels off once the solute is solubilized. The drive gain then remains at this higher level. Again, this may be utilized as an indication of dissolution alone, or may be utilized as a secondary indicator, along with density, that the solute was added in the correct amount and that it is fully dissolved. An overall shift in nominal drive gain and density indicates that the solute was added in the correct amount, and the stability of drive gain signal indicates that the solute has dissolved fully.

The graph of FIG. 3 is provided merely as an example of potential solids addition measurements. The shape of the curves, intensity of the peaks, slopes, return to a baseline or not, and other characteristics illustrated are merely examples. It will be recognized by those skilled in the art that different solids/solutes and different process fluids will exhibit potentially unique curve shape, unique peak shape and size, unique slopes, unique return(s) to baseline, unique combinations of the aforementioned, and generally unique signatures and/or drive gain/density behaviors—far too many to illustrate.

With the knowledge of how drive gain behaves relative to the phases present in the process, processes that are subject to changing phase fractions may be adjusted to more accurately measure flow rate.

A method for adjusting flowmeter 5 operation to compensate for phase fraction changes is illustrated in FIG. 4. In step 400 the flowmeter's 5 drive gain 306 is measured. Then, in step 402 it is determined whether the drive gain 306 is below a first "low" threshold. A measured drive gain below the first threshold point is indicative that there is a likelihood that the process fluid is comprised solely of liquids. Should this be the case, in step 404 a measured density 325 value would be used to determine a liquid concentration allocation, and mass flow would be allocated to each liquid in the process fluid. One example would be to utilize a watercut equation such as that of example Equation 7.

However, should it be determined in step 402 that the drive gain 306 is above the first "low" threshold, the drive gain would be further analyzed in step 406. A measured drive gain above the first threshold point is indicative that there is a likelihood that the process fluid comprises non-liquid components. The drive gain analysis of step 406 may, in an embodiment, ascertain whether the drive gain 306 is above the low threshold value, and also below a second, higher, drive gain level threshold. The drive gain analysis of step 406 could, in an embodiment, either alternatively or in conjunction with the second drive gain level threshold, determine whether the drive gain 306 is below a noise threshold or other measure of stability or variance, which may also be fixed, predetermined, and/or dynamically determined by algorithm. If, during the drive gain analysis of step 406, it is found that the drive gain is below the second drive gain level threshold and/or below the noise threshold, this is indicative of the potential presence of additional phases. Therefore, to aid in determining the composition of the process fluid, the density 325 of the process fluid is measured in step 408.

In step 408, if the density is determined to be within a range of densities associated with the presence of a solids phase, the mixture density and the liquid density values are utilized to calculate a liquid/solid concentration allocation in step 410. In an example, this calculation may comprise Equation 8 or similar. In knowing the portion of process flow that comprises liquids and the portion that comprises solids, flow rate calculations may be adjusted proportionally per phase allocation, thus providing a more accurate flow rate. It will be appreciated that the noted density ranges may vary depending on process materials, behavior of meter, etc., and may be fixed, predetermined, and/or dynamically determined by algorithm.

In step 408, if the density is determined to be lower than the range of densities associated with the presence of a solids phase, it is ascertained, in step 412, whether the density is determined to be lower than a liquid range threshold. If the density is not determined to be lower than a liquid range threshold, this is indicative of the presence of liquids, and step 404 is performed, wherein the measured density 325 value is used to determine a liquid concentration allocation, and mass flow is allocated to each liquid in the process fluid. One example would be to utilize a watercut equation such as that of example Equation 7.

If, on the other hand, it is ascertained in step 412 that the density is lower than the liquid range threshold, this is indicative of the presence of entrained gas, and step 414 is performed. In step 414, the measured mixture density and the liquid density values are utilized to calculate a GVF. In an example, this calculation may comprise Equation 5 or similar. In knowing the portion of process flow that comprises liquids and the portion that comprises gas, flow rate calculations may be adjusted proportionally per phase allocation, thus providing a more accurate flow rate.

Returning to the drive gain analysis of step 406, if it is found that the drive gain is above the second drive gain level threshold and/or above the noise threshold, this is indicative of the potential presence of additional phases. Therefore, to aid in determining the composition of the process fluid, the density 325 of the process fluid is measured in step 416. If in step 416 it is determined that the density is lower than the liquid range threshold, this is indicative of the presence of entrained gas, and step 414 is performed as described above. Again, in knowing the portion of process flow that comprises liquids and the portion that comprises gas, flow rate calculations may be adjusted proportionally per phase allocation, thus providing a more accurate flow rate.

For all points where flow rate is calculated in embodiments, flow rate may be allocated to an individual component, which can be output as an individual net flow rate, phase fraction, or accumulated in a totalizer.

If in step 416 it is determined that the density is higher than the liquid range threshold, an alarm or notification is generated in step 418 indicating a potential error.

Again, it should be emphasized that drive gain and density thresholds may be fixed, predetermined, and/or dynamically determined by algorithm during flowmeter 5 use. Liquid density can be user input, determined from known fluid properties, or automatically detected, using drive gain as an indicator of last liquid condition.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating systems, and not just to the embodiments described above and shown in the accompanying figures. Accordingly, the scope of the invention should be determined from the following claims.

What is claimed is:

1. A vibratory meter (5), comprising: a driver (104); a vibratory member (103, 103') vibratable by the driver (104); at least one pickoff sensor (105, 105') configured to detect vibrations of the vibratory member (103, 103'); meter electronics (20) comprising an interface (301) configured to receive a vibrational response from the at least one pickoff sensor (105, 105'), and a processing system (303) coupled to the interface (301) configured to: measure a drive gain (306) of the driver (104); measure a total density (325) of a multiphase process fluid in the vibratory meter (5); determine whether the drive gain (306) is below a first threshold; determine a liquid/liquid phase concentration allocation with the measured total density (325) if the drive gain (306) is below the first threshold, and calculate a flow rate for each liquid phase; determine at least one of whether the drive gain (306) is above a second threshold that is greater than the first threshold and whether the drive gain (306) is above a first drive gain noise threshold; and determine a gas/liquid phase concentration allocation with the measured total density (325) and a previously determined liquid density, if the measured total density (325) is lower than a liquid density range, and calculate a flow rate for each fluid phase.

2. The vibratory meter (5) of claim 1, wherein the processing system (303) is configured to: determine at least one of whether the drive gain (306) is below the second threshold that is greater than the first threshold, and whether the drive gain (306) is below the first drive gain noise threshold, if the drive gain (306) is above the first threshold.

3. The vibratory meter (5) of claim 2, wherein the processing system (303) is configured to: determine a solid/liquid phase concentration allocation with the measured total density (325) and a previously determined liquid density, if the measured total density (325) is within a solids density range, and calculate a flow rate for each fluid phase.

4. The vibratory meter (5) of claim 2, wherein the processing system (303) is configured to: determine a solid/liquid phase concentration allocation with the measured total density (325) and a previously determined liquid density, if the measured total density (325) is within a solids density range, and calculate a flow rate for each fluid phase.

5. The vibratory meter (5) of claim 2, wherein the processing system (303) is configured to: determine a gas/liquid phase concentration allocation with the measured total density (325) and a previously determined liquid density, if the measured total density (325) is lower than a solids density range and within a gas density range, and calculate a flow rate for each fluid phase.

6. A method of flowmeter phase fraction and concentration measurement adjustment comprising the steps of:
providing a vibratory flowmeter;
flowing a multiphase process fluid through the vibratory flowmeter;
measuring a drive gain of a driver of the vibratory meter;
measuring a density of the process fluid;
determining whether the drive gain is below a first threshold;
determining a liquid/liquid phase concentration allocation of the process fluid with the measured total density if the drive gain is below the first threshold, and calculate a flow rate for each liquid phase;
determining at least one of whether the drive gain is above a second threshold that is greater than the first threshold and whether the drive gain is above a first drive gain noise threshold;
determining that the measured total density is lower than a liquid density range; and
determining a gas/liquid phase concentration allocation with the measured total density and a previously determined liquid density, and calculate a flow rate for each fluid phase.

7. The method of flowmeter phase fraction and concentration measurement adjustment of claim 6, comprising the step of: determining that the drive gain is above the first threshold; and determining at least one of whether the drive gain is below the second threshold that is greater than the first threshold, and whether the drive gain is below the first drive gain noise threshold.

8. The method of flowmeter phase fraction and concentration measurement adjustment of claim 7, comprising the step of: determining that the measured total density is within a solids density range; and determining a solid/liquid phase concentration allocation with the measured total density and a previously determined liquid density, and calculate a flow rate for each fluid phase.

9. The method of flowmeter phase fraction and concentration measurement adjustment of claim 7, comprising the step of: determining that the measured total density is lower than a solids density range and within a liquids density range; and determining a liquid/liquid phase concentration allocation with the measured total density, and calculate a flow rate for each fluid phase.

10. The method of flowmeter phase fraction and concentration measurement adjustment of claim 7, comprising the step of: determining that the measured total density is lower than a solids density range and within a gas density range; and determining a gas/liquid phase concentration allocation with the measured total density and a previously determined liquid density, and calculate a flow rate for each fluid phase.

* * * * *